United States Patent
Won et al.

(10) Patent No.: US 11,875,553 B2
(45) Date of Patent: Jan. 16, 2024

(54) METHOD AND DEVICE FOR DETECTING OBJECT IN REAL TIME BY MEANS OF DEEP LEARNING NETWORK MODEL

(71) Applicant: DAEGU GYEONGBUK INSTITUTE OF SCIENCE AND TECHNOLOGY, Daegu (KR)

(72) Inventors: Woong Jae Won, Seoul (KR); Tae Hun Kim, Gyeongsan-si (KR); Soon Kwon, Daegu (KR); Jin Hee Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 424 days.

(21) Appl. No.: 17/282,468

(22) PCT Filed: Sep. 30, 2019

(86) PCT No.: PCT/KR2019/012699
§ 371 (c)(1),
(2) Date: Apr. 2, 2021

(87) PCT Pub. No.: WO2020/071701
PCT Pub. Date: Apr. 9, 2020

(65) Prior Publication Data
US 2021/0383165 A1  Dec. 9, 2021

(30) Foreign Application Priority Data

Oct. 5, 2018  (KR) .......................... 10-2018-0118856

(51) Int. Cl.
*G06V 10/00* (2022.01)
*G06V 10/77* (2022.01)
(Continued)

(52) U.S. Cl.
CPC ........ *G06V 10/7715* (2022.01); *G06F 18/214* (2023.01); *G06F 18/2137* (2023.01); *G06N 3/04* (2013.01)

(58) Field of Classification Search
CPC ..................... G06N 3/04; G06N 3/045; G06T 2207/20024; G06T 2207/20081;
(Continued)

(56) References Cited

U.S. PATENT DOCUMENTS 11,074,711 B1 *  7/2021  Akbas .................. G06V 10/454
2015/0347861 A1  12/2015  Doepke et al.
(Continued)

FOREIGN PATENT DOCUMENTS

| KR | 10-2015-0052924 | 5/2015 | |
|---|---|---|---|
| KR | 10-2018-0065866 | 6/2018 | |
| WO | WO-2020071701 A1 * | 4/2020 | ............... G06K 9/03 |

OTHER PUBLICATIONS

Won, Woong-Jae, et al. "Aggnet: Simple aggregated network for real-time multiple object detection in road driving scene." 2018 21st International Conference on Intelligent Transportation Systems (ITSC). IEEE, 2018.*

(Continued)

*Primary Examiner* — Li Liu
(74) *Attorney, Agent, or Firm* — LEX IP MEISTER, PLLC

(57) ABSTRACT

Disclosed are a real-time object detection method and an apparatus therefor. An object detection apparatus may receive an input image, may extract a first feature map from the input image, may detect an object included in the input image based on the first feature map, may extract, from the input image, a second feature map having resolution higher than the resolution of the first feature map, may extract a third feature map from the second feature map based on the (Continued)

region of the detected object, and may redetect the object based on the first feature map and the third feature map.

18 Claims, 7 Drawing Sheets

(51) Int. Cl.
  *G06N 3/04* (2023.01)
  *G06F 18/2137* (2023.01)
  *G06F 18/214* (2023.01)

(58) Field of Classification Search
  CPC ...... G06T 2207/20084; G06T 2210/12; G06V 10/22; G06V 10/7715
  See application file for complete search history.

(56) References Cited

U.S. PATENT DOCUMENTS

2018/0150684 A1   5/2018   Wang et al.
2020/0143205 A1*  5/2020   Yao .......................... G06N 3/08

OTHER PUBLICATIONS

Teichmann, Marvin, et al. "Multinet: Real-time joint semantic reasoning for autonomous driving." 2018 IEEE intelligent vehicles symposium (IV). IEEE, 2018.*
Zhang, Pingping, et al. "Amulet: Aggregating multi-level convolutional features for salient object detection." Proceedings of the IEEE international conference on computer vision. 2017.*
Yoo, Donggeun, et al. "Attentionnet: Aggregating weak directions for accurate object detection." Proceedings of the IEEE international conference on computer vision. 2015.*
He, Kaiming, et al. "Deep residual learning for image recognition." Proceedings of the IEEE conference on computer vision and pattern recognition. 2016.*
Woong-Jae Won et al., "Real-Time CNN Model for Multi-Object Detection in Driving Scene", 2018 The Korean Society of Automotive Engineers Spring Conference p. 822-826, Jun. 2018.

* cited by examiner

METHOD AND DEVICE FOR DETECTING OBJECT IN REAL TIME BY MEANS OF DEEP LEARNING NETWORK MODEL

BACKGROUND OF THE INVENTION

1. Field of the Invention

The present disclosure relates to a convolutional neural network (CNN) processing technology.

2. Description of the Prior Art

A neural network-based deep learning technology is utilized in various fields. For example, a deep learning-based biometric identification/authentication application that performs facial recognition, iris recognition, voice recognition, or the like may be employed by a terminal (e.g., a smart phone) where the application is embedded. A convolutional neural network (CNN) is a multi-layer neural network that utilizes a convolutional operation, and shows high performance in the deep learning-based image and voice recognition fields.

Legacy faster-RCNN performs region proposal network (RPN)-based object detection, but regression modeling and a classification process are separated. Accordingly, an operation speed is slow. To improve this, an object detection model using a fully convolutional network (FCN) structure has been proposed. The models consider a generally efficient structure, such as a VGG network or the like, as a CNN layer. However, in the structure such as the VGG network, feature information associated with a receptive field tends to decrease as the number of convolutional layers increases. Therefore, the performance of detecting a small object may slightly deteriorate. Accordingly, recently, R-FCN and DSSD models improve performance by applying a residual network that is capable of overcoming the drawback. In addition, the legacy object detection models propose various multi-scale feature schemes capable of improving expressiveness and receptiveness associated with object feature information, so as to improve performance associated with various shapes of objects and various changes in size. However, a multi-scale feature scheme also does not show perfect performance in detecting a small object or the like during driving.

In addition, recently, CNN structures are being proposed which are capable of increasing receptiveness and expressiveness for information associated with various types, shapes, and sizes, such as ResNet, SeNet, and the like. However, the amount of operation is increased since a block is further added.

SUMMARY OF THE INVENTION

A CNN-based multi-object detection model according to an embodiment can reduce a loss of information associated with a small receptive field by performing a small number of operations, and can detect an occluded object and a small object well. The CNN-based multi-object detection model according to an embodiment may combine high-resolution feature information by performing a small number of operations without defining an anchor box in advance, and may detect various sizes of objects based on the combined feature information.

According to an embodiment, a real-time object detection method may include: receiving an input image and extracting a first feature map from the input image by performing high-speed convolution between an input and a kernel via a high-speed convolutional network; detecting an object included in the input image based on the first feature map; extracting, from the input image, a second feature map having resolution higher than the resolution of the first feature map; extracting a third feature map from the second feature map based on a region of the detected object; and redetecting the object based on the first feature map and the third feature map. According to an embodiment, the operation of extracting the second feature map may include: providing the input image to the CNN; and obtaining the second feature map from an intermediate layer having a dimension larger than a dimension of an output layer of the CNN. According to an embodiment, the operation of extracting the third feature map includes sampling elements in a bounding box corresponding to the region of the detected object. According to an embodiment, the operation of redetecting the object region may include: concatenating the first feature map and the third feature map; and applying a plurality of filters corresponding to a detection result associated with the object to the concatenated feature map. According to an embodiment, the operation of extracting the first feature map from the input image may include: providing the input image to the CNN; and applying, to an output of the CNN, a plurality of filters corresponding to a plurality of features included in the first feature map. According to an embodiment, the operation of detecting the object may include: applying a plurality of filters corresponding to a detection result associated with the object to the first feature map. According to an embodiment, the operation of redetecting the object may include: detecting candidate regions corresponding to the object in the input image based on the first feature map and the third feature map; and determining a final detection region based on the candidate regions. According to an embodiment, a convolutional neural network is provided, wherein the neural network that extracts the first feature map may include: a first layer; a second layer connected to the first layer, and configured to perform convolution that is based on a receptive field that exceeds a predetermined size, based on an output of the first layer; and a third layer connected to the first layer and the second layer, wherein the third layer collects an aggregation of the output of the first layer and an output of the second layer. According to an embodiment, the operation of extracting the third feature map may include: dividing a plurality of channels included in the second feature map; producing an aggregated second feature map by performing an element-wise operation based on the divided channels; and extracting the third feature map from the aggregated second feature map based on the region of the detected object. According to an embodiment, an object detection apparatus may include a processor configured to: receive an input image; extract a first feature map from the input image; detect an object included in the input image based on the first feature map; extract, from the input image, a second feature map having resolution higher than the resolution of the first feature map; extract a third feature map from the second feature map based on a region of the detected object; and redetect the object based on the first feature map and the third feature map.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
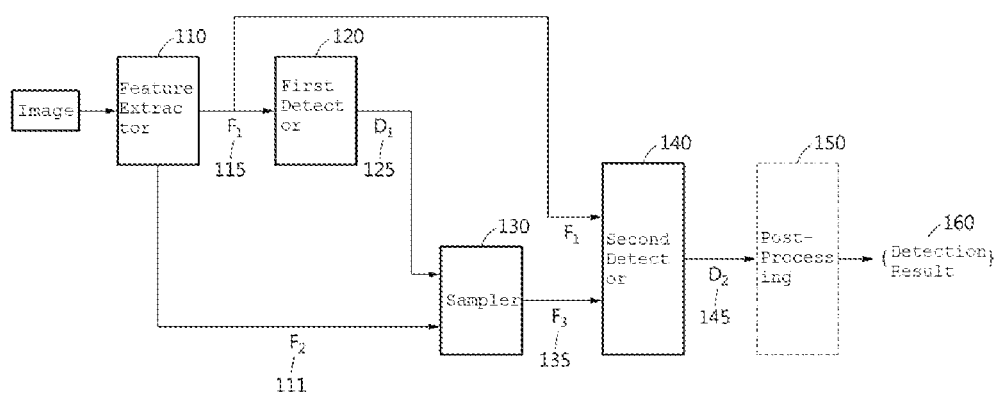
FIG. 1 is a diagram illustrating an object detection apparatus according to an embodiment.

Specific structural and functional details disclosed herein are merely representative for purposes of describing example embodiments. Example embodiments may, however, be embodied in many alternate forms. Accordingly, it should be understood that there is not intent to limit example embodiments to the particular forms disclosed, but to the contrary, example embodiments are to cover all modifications, equivalents, and alternatives falling within the scope of the example embodiments.

It will be understood that, although the terms first, second, and the like may be used herein to describe various elements, these terms are only used to distinguish one element from another. For example, a first element could be termed a second element, and, similarly, a second element could be termed a first element.

It will be understood that when an element is referred to as being "connected" to another element, it may be directly connected or coupled to the other element or intervening elements may be present.

As used herein, the singular forms are intended to include the plural forms as well, unless the context clearly indicates otherwise. It will be further understood that the terms "comprises", "includes", or the like when used in this specification, specify the presence of stated features, integers, steps, operations, elements, components, or a combination thereof, but do not preclude the presence or addition of one or more other features, integers, steps, operations, elements, components, or a combination thereof.

Unless defined differently, all terms used herein, which include technical terminologies or scientific terminologies, have the same meaning as commonly understood by one of ordinary skill in the art to which the present disclosure belongs. Such terms as those defined in commonly used dictionaries are to be interpreted to have the meanings equal to the contextual meanings in the relevant field of art, and are not to be interpreted to have ideal or excessively formal meanings unless clearly defined in the present disclosure.

Hereinafter, detailed description of embodiments will be provided with reference to drawings. Reference will now be made to example embodiments, which are illustrated in the accompanying drawings, wherein like reference numerals may refer to like components throughout.

FIG. 1 is a diagram illustrating an object detection apparatus according to an embodiment.

Referring to FIG. 1, an object detection apparatus according to an embodiment may include a feature extractor 110, a first detector 120, a sampler 130, and a second detector 140. The object detection apparatus is an apparatus for detecting an object, and may be implemented as, for example, one or more software modules, one or more hardware modules, or various combinations thereof.

The feature extractor 110 may extract a first feature map 115 from an input image. The input image is an image including an object that is desired to be detected, for example, an image including an object(s) in a predetermined class such as a vehicle, a pedestrian, a bicycle, or the like. The input image may be obtained by a camera. For example, the input image may be obtained by a camera disposed to obtain an image while a vehicle is driving. The first feature map 115 may include a plurality of features extracted from the input image. Each of the plurality of features may has two dimensions (e.g., 12×39), and the first feature map 115 may have three dimensions (e.g., 12×39×500).

The first detector 120 may detect information associated with an object from the first feature map. For example, the first detector may output information associated with a bounding box corresponding to a detection result. The bounding box is in a polygonal shape that encloses an object desired to be detected, and the detection result may include location information and size information of the bounding box. For example, if the bounding box is in a rectangular shape, the location information of the bounding box may include the coordinates of one corner of the rectangular shape and the size information of the bounding box may include the width and the height of the rectangular shape.

The feature extractor 110 may extract a second feature map 111 from the input image. The second feature map may include a plurality of features extracted from the input image. Each of the plurality of features may have two-dimensions (e.g., 48×156) greater than those of the first feature map, and the second feature map 111 may have three dimensions (e.g., 48×156×512).

The feature extractor may include a plurality of layers. For example, the feature extractor may include an input layer, one or more hidden layers, and an output layer. The feature extractor may include a hidden layer having a dimension greater than that of the output layer. In this instance, the feature extractor may output the second feature map using the hidden layer having a dimension greater than that of the output layer. Therefore, the second feature map may include information of resolution higher than the resolution of the first feature map. The hidden layer may include a convolutional layer.

The sampler 130 may extract a third feature map 135 from the second feature map. The sampler may perform sampling of the second feature map based on information associated with the object (e.g., the bounding box) detected by the first detector. Although described below, according to an embodiment, the second feature map may be sampled after going through channel aggregation.

The operation of the sampler and the detailed description related to the second feature map will be described with reference to FIGS. 2 and 5.

The second detector may detect information associated with an object from the first feature map and the third feature map. According to an embodiment, the first feature map and the third feature map may be concatenated before the detection process.

The second detector may further use the second feature map having resolution higher than the resolution of the first feature map, in addition to the first feature map used by the first detector. Accordingly, the reliability of the object detected by the second detector may have a higher reliability than that of the object detected by the first detector.

The detected object may include a plurality of pieces of information. For example, information associated with which of the object(s) in predetermined classes corresponds to the detected object, information associated with whether the object corresponds to a background or foreground, location information, size information, or various combinations thereof may be included.

A CNN-based multi-object detection model according to an embodiment may reduce a loss of information associated with a small receptive field by performing a small number of operations, and may effectively detect an occluded object and a small object. The CNN-based multi-object detection model according to an embodiment may detect objects in various sizes by combining feature information having high resolution with a small number of operations, without defining various blocks or filters, such as an anchor box or the like.

Figure 2:
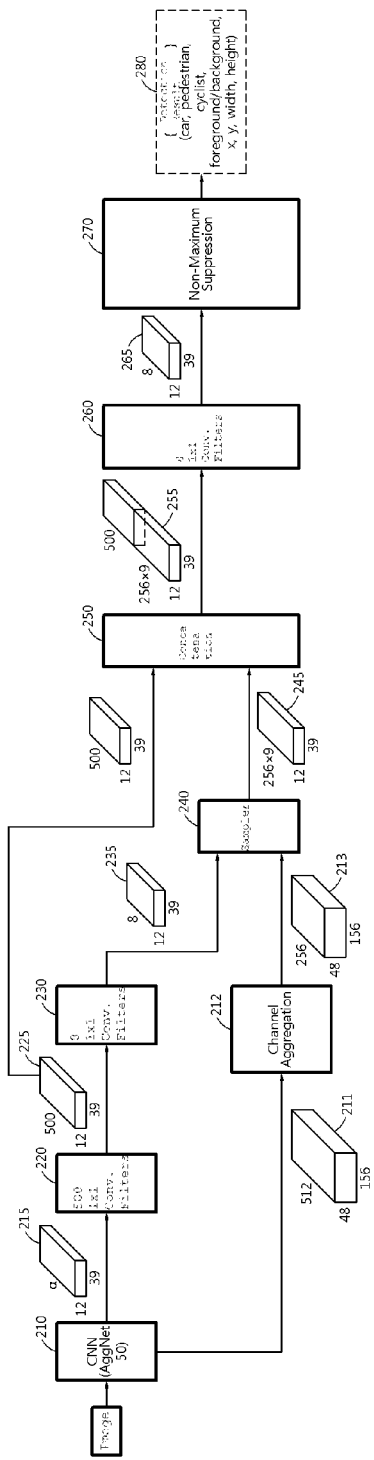
FIG. 2 is a diagram illustrating an object detection apparatus according to an embodiment.

FIG. 2 is a diagram illustrating an object detection apparatus according to an embodiment.

Referring to FIG. 2, the feature extractor 110 may include a CNN 210 and a plurality of filters 220. The CNN may include convolutional layers designed to perform a convolutional operation. The convolutional layers included in the CNN may perform a convolutional operation associated with an input using a kernel. According to an embodiment, the CNN included in the feature extractor may be AggNet50 which is improved from the legacy representative model, ResNet 50. Detailed descriptions related to AggNet50 will be described with reference to FIG. 4.

The plurality of filters included in the feature extractor may correspond to 500 1×1 convolutional filters. Each of the plurality of features included in the first feature map 115 may have two dimensions. For example, if the two dimensions correspond to 12×39, the first feature map to which 500 1×1 convolutional filters are applied may have dimensions of 12×39×500.

The first detector 120 may include a plurality of filters 230. The number of filters may differ depending on the information associated with an object that is desired to be obtained. For example, if the information desired to be obtained is {car, pedestrian, cyclist, foreground/background, x, y, width, height} 280, the first detector may include 8 1×1 convolutional filters. In this instance, an output 235 having dimensions of 12×39×8 may be produced. If the number of classes for an object is n, an object result having dimensions of 12×39×(n+5) may be output via (n+5) 1×1 convolutional filters.

The second feature map 111 may include information of resolution higher than the resolution of the first feature map. For example, each of the plurality of features included in the second feature map may have dimensions 211 of 48×156.

According to an embodiment, the second feature map may go through channel aggregation 212 before being sampled. For example, a new feature map having dimensions of 48×156×256 may be produced by dividing the second feature map having dimensions of 48×156×512 into two channels, and performing matched element-wise multiplication. The method of performing channel division and element-wise multiplication for channel aggregation may be variously modified, and the detailed descriptions related to the channel aggregation will be described with reference to FIG. 5.

The sampler 130 and 240 may use the information associated with the object detected by the first detector as a bounding box, and may perform sampling of the second feature map so as to extract a third feature map. For example, the sampler may map an object region, estimated for each cell included in the detection result that the first detector obtains using the first feature map, to the second feature map which is a higher layer. The sampler may divide the mapped region into a plurality of grids (e.g., 9 grids by dividing the width and the height into three), and may select the value of a predetermined location (e.g., a central location) for each grid as a sample value.

For example, if the dimensions of the first feature map correspond to 12×39×500 and the dimensions of the second feature map correspond to 48×156×256, a channel value of 256*9 may be obtained for each cell, and a third feature map 245 having dimensions of 12×39×(256×9) may be extracted.

The first feature map and the third feature map may be concatenated 250 before the detection process. For example, if the first feature map has the dimensions of 12×39×500, and the third feature map has the dimensions of 12×39×(256×9), a feature map 255 having dimensions of 12×39×(500+256×9) may be produced via concatenation.

The second detector 140 may include a plurality of filters 260. The number of filters may differ depending on the information associated with an object that is desired to be obtained. For example, if the information desired to be obtained is {car, pedestrian, cyclist, foreground/background, x, y, width, height} 280, the first detector may include 8 1×1 convolutional filters. In this instance, an output 235 having dimensions of 12×39×8 may be produced. If the number of classes for an object is n, an object result having dimensions of 12×39×(n+5) may be output via (n+5) 1×1 convolutional filters.

According to an embodiment, a post-processing operation 150 may be performed based on the output of the second detector. If a plurality of candidate regions are output by the second detector, a post-processing operation may be performed which determines a final detection region based on the plurality of candidate regions. For example, each cell of 12×39 may include information associated with the bounding box, and the bounding boxes indicated by the cells may overlap each other. A post-processor may determine the final detection region based on the probability that the bounding box will include the object.

For example, the post-processor may determine the final detection region using a non-maximum suppression scheme 270. According to an embodiment, the post-processor may suppress a bounding box that at least a predetermined ratio overlaps a bounding box having the highest probability, so as to determine the final detection region. The final detection region may include one or more bounding boxes.

The specifications in FIG. 2, such as dimensions of a feature and a filter, and the like, are merely an example, and the specifications for implementing the embodiments can be modified variously.

Figure 3:
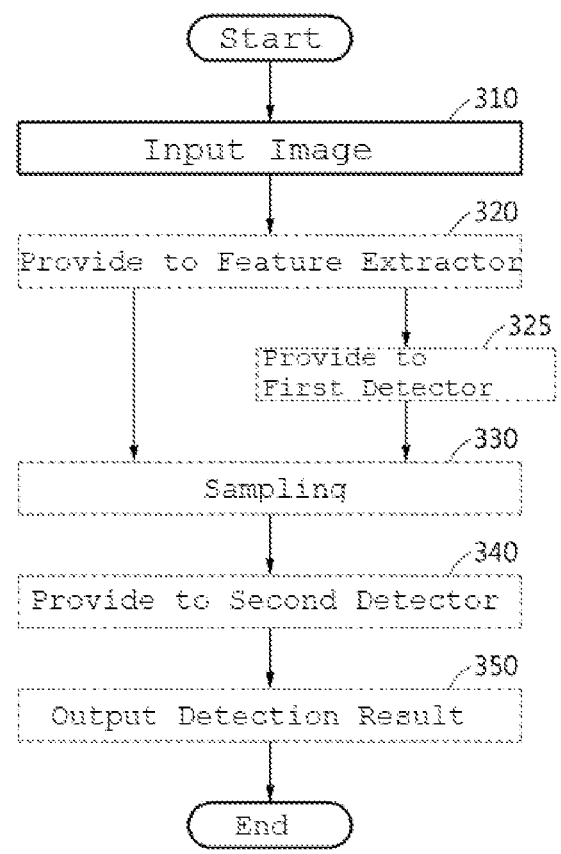
FIG. 3 is a flowchart illustrating an object detection method according to an embodiment.

FIG. 3 is a flowchart illustrating an object detection method according to an embodiment.

Referring to FIG. 3, an input image is received in image input operation 310. Feature extraction may be performed by the feature extractor 110 of FIG. 1. The feature extractor may extract a first feature map and a second feature map from the input image.

In operation 325 for provision to a first detector, the first feature map may be provided to the first detector, which may be performed by the first detector 120 of FIG. 1. The first detector may detect information associated with an object from the first feature map.

In sampling operation 330, the second feature map may be provided to the sampler, which may be performed by the sampler 130 of FIG. 1. The sampler may use information associated with the object detected by the first detector as a bounding box, and may perform sampling of the second feature map. The sampler may extract a third feature map from the second feature map.

In operation 340 for provision to a second detector, the third feature map may be provided to the second detector, which may be performed by the second detector 140 of FIG. 2. The second detector may detect information associated with an object from the third feature map, and may output a detection result in operation 350.

Figure 4:
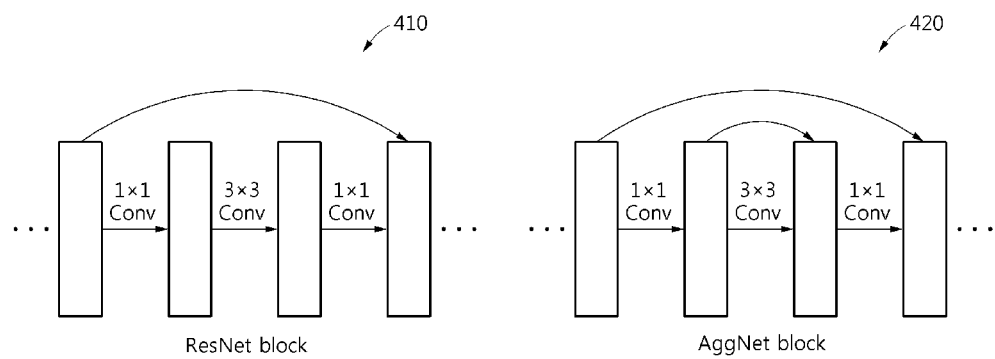
FIG. 4 is a diagram illustrating a processing operation in an AggNet block according to an embodiment.

FIG. 4 is a diagram illustrating a processing operation in an AggNet block according to an embodiment.

According to an embodiment, there is provided a technology that preserves information that is lost as the size of a receptive field increases via layer-wise aggregation. The layer-wise aggregation may include an aggregation of layers before and after convolution that is based on a receptive field exceeding a predetermined size (e.g., 1×1).

For example, referring to FIG. 4, an AggNet 420 that is modified from a normal CNN mode, an ResNet 410, may be used for a module of the feature extractor 110. The AggNet may produce an aggregation by aggregating a layer before a 3×3 convolutional layer of ResNet and a layer after the 3×3 convolutional layer.

In the case of the ResNet, the size of the receptive field increases by passing through the 3×3 convolutional layer. Accordingly, as the number of layers increases, information is lost and thus, it is difficult to detect an object having a small size. However, in the case of the AggNet, information before passing through the 3×3 convolutional layer is not lost. Accordingly, information associated with a small receptive field may also be transferred and loss of information is prevented and an object having a small size may be detected.

Figure 5:
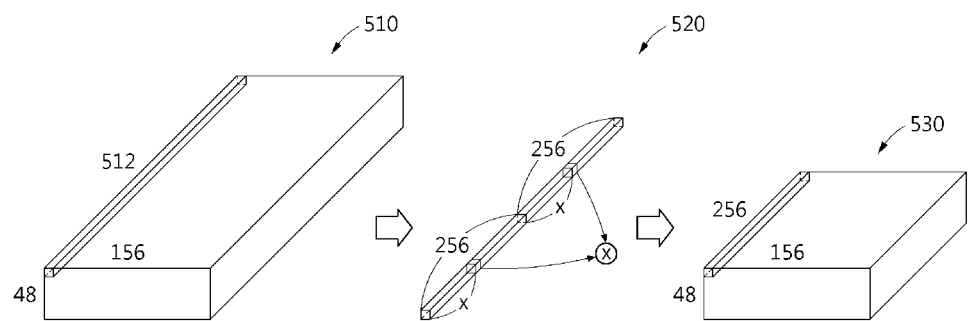
FIG. 5 is a diagram illustrating a processing operation in a channel aggregation according to an embodiment.

FIG. 5 is a diagram illustrating an operation of processing channel aggregation according to an embodiment.

Referring to FIG. 5, channel aggregation 212 is a series of operations of producing an aggregated feature map by dividing a feature map into a plurality of channels, and performing an element-wise operation based on the divided channels. For example, a new feature 530 map having dimensions of 48×156×256 may be produced by dividing a feature map 510 having dimensions of 48×156×512 into two channels, and performing matched element-wise multiplication 520. According to an embodiment, a channel division method and the number of divided channels may be variously changed. In addition, the divided channels may be aggregated via other operations such as element-wise addition or the like, instead of being aggregated via element-wise multiplication.

A feature may be enhanced by performing sampling after channel aggregation, instead of directly performing sampling of the second feature map 111. When back-propagation is performed during learning, a slope between channels may be aggregated and learning is effectively performed.

Figure 6:
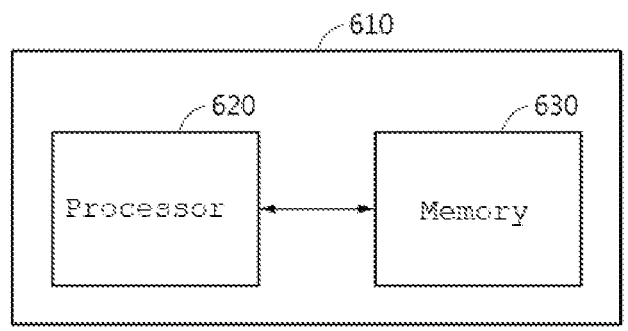
FIG. 6 is a diagram illustrating the configuration of an object detection apparatus according to an embodiment.

FIG. 6 is a diagram illustrating the configuration of an object detection apparatus according to an embodiment.

Referring to FIG. 6, an object detection apparatus 601 may include a processor 602 and a memory 603. The processor 602 may include at least one apparatus described in FIGS. 1 to 5, or may perform at least one method mentioned in FIGS. 1 to 5. The memory 603 may store at least one among the features of input images and the features of feature maps, or may store a program for implementing an object detection method. The memory 603 may include a volatile memory or a non-volatile memory.

The processor 602 may implement a program, and may control the object detection apparatus 601. The code of a program implemented by the processor 602 may be stored in the memory 603. The object detection apparatus 601 may be connected to an external device (e.g., a personal computer or a network) via an input/output device, and may exchange data.

Figure 7:
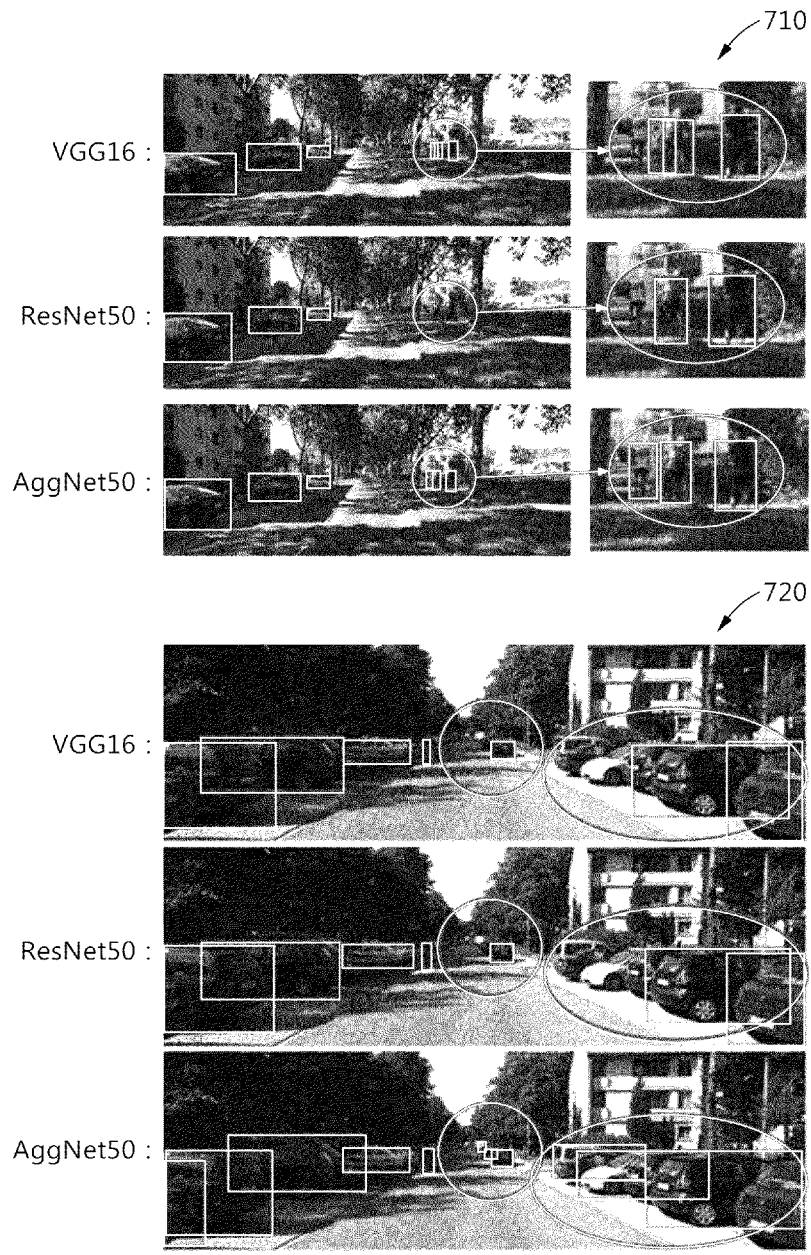
FIG. 7 is a diagram illustrating an object detection result according to an embodiment.

FIG. 7 is a diagram illustrating an object detection result according to an embodiment.

Referring to FIG. 7, an object detection model based on the AggNet 420 of the present disclosure is capable of detecting a small object better than an object detection model based on a legacy CNN model, VGG16, or ResNet50, as shown in diagram 710. In addition, the object detection model based on AggNet may be capable of detecting an occluded object better than the object detection model based on the legacy CNN model, as shown in diagram 720.

Figure 8:
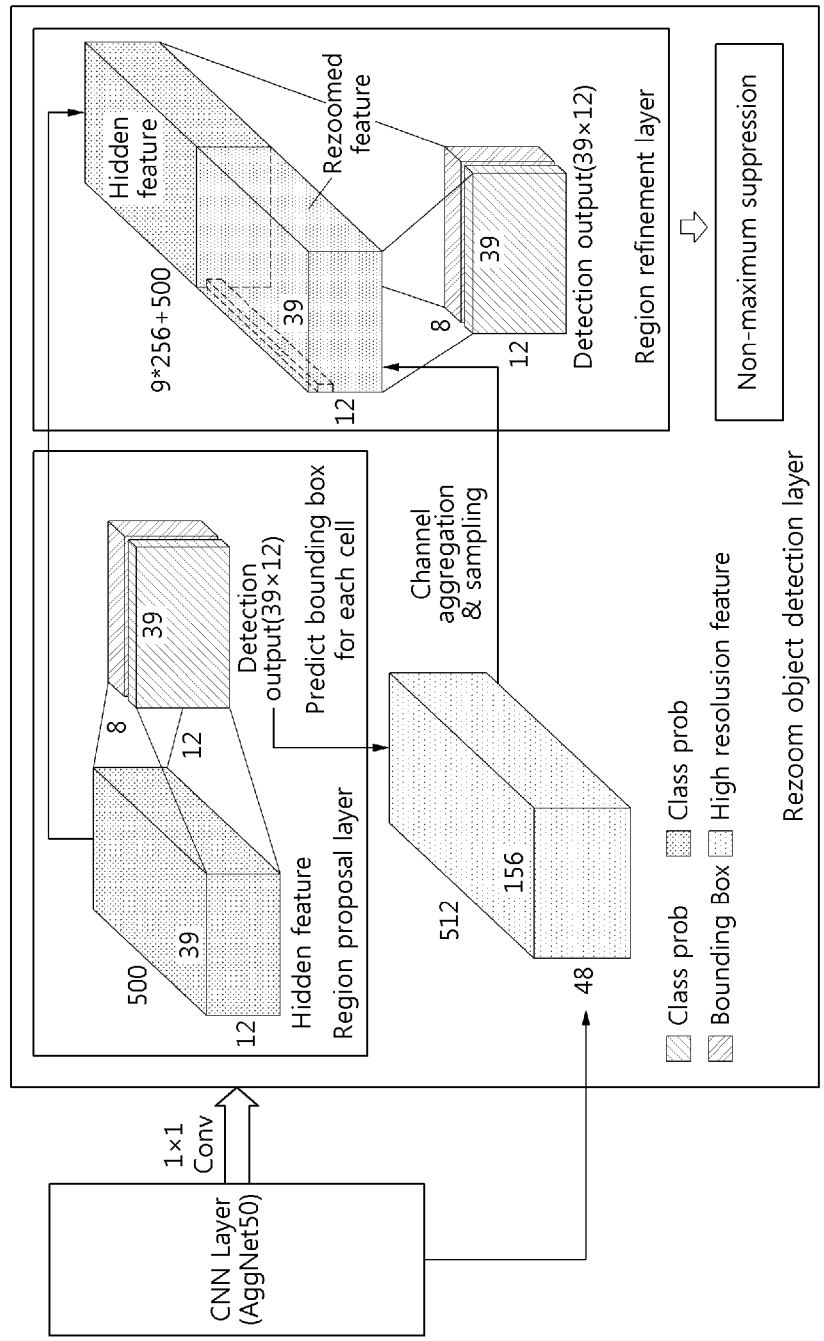
FIG. 8 is a diagram illustrating a multi-object detection model according to an embodiment.

FIG. 8 is a diagram illustrating a multi-object detection model according to an embodiment.

Conventional technologies for multi-object detection fail to overcome drawbacks which are associated with the amount of power consumed by a large number of operations, systematic performance related to real-time, distortion of an image, occlusion of object, a change in the size/shape of an object, and the like.

The present disclosure applies a structure that is different from the legacy object detection model, so as to overcome the above-described drawbacks.

First, the legacy object detection model applies a multi-scale template (anchors)/feature scheme in order to secure the performance robust against changes in the sizes/shapes of various objects. However, a large number of operations is required and feature information of an object is lost. Accordingly, an image may be distorted or the detecting performance may deteriorate due to a change in shape. Accordingly, the present disclosure may apply an Rezoom layer that extracts feature information having high resolution with a small number of operations, and improves object detection performance.

Second, in the case of the legacy CNN-based object detection model, feature information of a small object is lost, as the depth of a layer becomes deeper. Accordingly, it is difficult to detect a small object. In order to solve the drawback, the present disclosure suggests a simple aggregation network block that reduces a loss of information associated with a small receptive field, so as to well detect occlusion/a small object.

CNN-Based Multi-Object Detection Model

FIG. 8 illustrates a CNN-based multi-object detection model. A CNN layer is a model (AggNet50) obtained by applying an aggregation network block to legacy ResNet50, and may produce a CNN feature associated with an input image. A region proposal layer (RPL) produces a hidden feature by performing 1×1 convolution on the last layer feature of the CNN layer, and roughly estimates a region and object class information for each cell (grid) via 1×1 convolution again. A region refinement layer produces a Rezoom feature based on the briefly estimated region and object class information, and estimates a region and object class information with high accuracy using the Rezoom feature.

Rezoom Layer for Object Detection

As illustrated in FIG. 8, the Rezoom layer produces a 12×39×500 hidden feature map of the region proposal layer by performing 1×1 convolution on the last layer of the CNN layer (AggNet50). The produced hidden feature map may produce a detection output of 12×39×8 that estimates a bound box (x, y, width, height) of an object, objectness (foreground/background), an object class probability (car, pedestrian, cyclist) estimated for each cell using 8 1×1 convolution filters. In order to obtain a feature having high resolution for object detection, a 48×156×256 feature map is produced by performing channel aggregation on a higher feature layer (AggNet_Block2: 156×48×512) of the CNN layer, and a Rezoomed feature of 12×39×(9×256) is produced by performing sampling on each object region estimated for each cell in the RPL. Here, the sampling may perform mapping of the object region estimated for each cell to the feature map, may divide the width and height into three parts so as to have 9 grids, may select a central location value of each grid as a sample value, and may obtain a 9*256 channel value for each cell.

In RRL, the Rezoomed feature and the hidden feature obtained in the RPL are concatenated, a final object detection feature of 12×39×(9×256+500) is extracted, and object class/region information of 12×39×8 for each cell is estimated by performing full convolution. Finally, object class/regions may be determined by performing a non-maximum suppression process on the estimated class/region information.

Aggregate Network Layer

The present disclosure may modify a residual block of ResNet50 into an aggregation network block (AggNet block), and may apply the AggNet block to a CNN layer in order to detect a small object by reducing a loss of information associated with a small receptive field. According to the legacy ResNet model, a receptive field increases due to 3×3 convolution performed between layers. However, in the present disclosure, by aggregating a result obtained by performing 3×3 convolution and a previous layer, the structure is modified to well transfer feature information of a small receptive field.

In addition, as opposed to the legacy method that merely performs sampling of an upper layer feature (AggNet_Block2) of a CNN, the present disclosure divides an upper CNN layer feature into two regions based on a channel, performs element-wise multiplication for each of the channels that match the two regions so as to configure a channel aggregation feature, and performs sampling thereof, in order to extract the Rezoomed feature.

The present disclosure provides a CNN-based real-time object detection model that is capable of effectively detecting object occlusion/a small object in a driving environment. The object detection model may replace a residual-block of the legacy ResNet 50 with an aggregation block, and may use a Rezoom layer, instead of using the legacy multi-scale anchors/feature scheme, thereby efficiently improving the performance of detecting occlusion or a small object.

The above-described embodiments may be implemented by hardware components, software components, and/or a combination of the hardware components and software components. For example, the apparatus, method, and components described in the embodiments may be implemented using one or more general-purpose computers or special-purpose computers, such as a processor, controller, an arithmetic logic unit (ALU), a digital signal processor, a microcomputer, a field programmable gate array (FPGA), a programmable logic unit, a microprocessor, or another device that is capable of implementing an instruction and providing a response thereto. A processing device may operate an operating system (OS) and one or more software applications implemented in the OS. In addition, the processing device may access, store, modify, process, and produce data in response to implementation of software. Although it is described that a single processing device is used for ease of description, those skilled in the art may understand that the processing device includes a plurality of processing elements and/or a plurality of types of processing elements. For example, the processing device may include a plurality of processor, or a single processor and a single controller. In addition, the processing device may be implemented to have another processing configuration such as a parallel processor.

Software may include computer programs, codes, instructions, or a combination of one or more of them, and may configure a processing device to operate as intended, or may command a processing device to operate independently or collectively. Software and/or data may be embodied permanently or temporarily in a type of machine, a component, a physical device, a virtual equipment, a computer storage medium or device, or a transmitted signal wave, in order to be interpreted by a processing device or in order to provide an instruction or a data to a processing device. Software may be distributively stored in or implemented in a computer system connected over a network. Software and data may be stored in one or more computer recordable recording media.

The method according to the embodiments of the present disclosure may be implemented in the form of program instructions executed through various computer means, and may be recorded in a computer readable medium. The computer readable medium may include a program instruction, a data file, a data structure, and the like independently or in combination. The program instruction recorded in the medium may be designed or configured especially for the embodiments or may be publicly known to those skilled in the computer software field and may be allowed to be used. The computer readable recording medium may include, for example, magnetic media such as hard disk, floppy disk, and magnetic tape, optical media such as CD-ROM and DVD, magneto-optical media such as floptical disk, and a hardware device configured to store and implement program instructions such as ROM, RAM, flash memory, and the like. In addition, the program instructions may include, for example, high class language codes, which can be executed in a computer by using an interpreter, as well as machine codes made by a compiler. The aforementioned hardware device may be configured to operate as one or more software modules in order to perform operations in the embodiments of the present disclosure, and vice versa.

Although the embodiments have been described with reference to a limited number of drawings, those skilled in the art would make various changes or modifications based thereon. For example, although the above-described technology is implemented in a different order from the above-described method, and/or the above-described system, structure, apparatus, and components such as a circuit or the like are coupled or combined in a different manner from the above-described method, or are replaced with other components or equivalents, an appropriate result can be obtained.

Therefore, other implementations, other embodiments, and equivalents to claims belong to the scope of the claims.

What is claimed is:
1. An object detection method comprising:
 receiving an input image;
 extracting a first feature map from the input image;
 detecting an object included in the input image based on the first feature map;

extracting, from the input image, a second feature map having a resolution higher than a resolution of the first feature map;

extracting a third feature map from the second feature map based on a region of the detected object; and redetecting the object based on the first feature map and the third feature map.

2. The object detection method of claim 1, wherein the extracting of the second feature map comprises:

providing the input image to a convolutional neural network (CNN); and obtaining the second feature map from an intermediate layer having a dimension larger than a dimension of an output layer of the CNN.

3. The object detection method of claim 1, wherein the extracting of the third feature map comprises:

sampling elements in a bounding box corresponding to the region of the detected object.

4. The object detection method of claim 1, wherein the redetecting of the object region comprises:

concatenating the first feature map and the third feature map; and applying a plurality of filters corresponding to a detection result associated with the object to the concatenated feature map.

5. The object detection method of claim 1, wherein the extracting of the first feature map from the input image comprises:

providing the input image to a convolutional neural network (CNN); and applying, to an output of the CNN, a plurality of filters corresponding to a plurality of features included in the first feature map.

6. The object detection method of claim 1, wherein the detecting of the object comprises:

applying a plurality of filters corresponding to a detection result associated with the object to the first feature map.

7. The object detection method of claim 1, wherein the redetecting of the object comprises:

detecting candidate regions corresponding to the object in the input image based on the first feature map and the third feature map; and determining a final detection region based on the candidate regions.

8. The object detection method of claim 1, wherein a neural network that extracts the first feature map comprises:

a first layer;

a second layer connected to the first layer, and configured to perform convolution that is based on a receptive field that exceeds a predetermined size, based on an output of the first layer; and a third layer connected to the first layer and the second layer, wherein the third layer collects an aggregation of the output of the first layer and an output of the second layer.

9. The object detection method of claim 1, wherein the extracting of the third feature map comprises:

dividing a plurality of channels included in the second feature map;

producing an aggregated second feature map by performing an element-wise operation based on the divided channels; and extracting the third feature map from the aggregated second feature map based on the region of the detected object.

10. A non-transitory computer readable recording medium storing instructions that, when executed by a processor, cause the processor to perform the method of claim 1.

11. An object detection apparatus comprising:

a memory configured to store one or more instructions; and a processor configured to, by executing the one or more instructions:

receive an input image;

extract a first feature map from the input image;

detect an object included in the input image based on the first feature map;

extract, from the input image, a second feature map having a resolution higher than a resolution of the first feature map;

extract a third feature map from the second feature map based on a region of the detected object; and redetect the object based on the first feature map and the third feature map.

12. The object detection apparatus of claim 11, wherein the processor is further configured to:

provide the input image to a convolutional neural network (CNN); and obtain the second feature map from an intermediate layer having a dimension larger than a dimension of an output layer of the CNN.

13. The object detection apparatus of claim 11, wherein the processor is further configured to:

perform sampling of elements in a bounding box corresponding to the region of the detected object.

14. The object detection apparatus of claim 11, wherein the processor is further configured to:

concatenate the first feature map and the third feature map; and apply a plurality of filters corresponding to a detection result associated with the object to the concatenated feature map.

15. The object detection apparatus of claim 11, wherein the processor is further configured to:

provide the input image to a convolutional neural network (CNN); and apply a plurality of filters corresponding to a plurality of features included in the first feature map to an output of the CNN.

16. The object detection apparatus of claim 11, wherein the processor is further configured to apply a plurality of filters corresponding to a detection result associated with the object to the first feature map.

17. The object detection apparatus of claim 11, wherein the processor is further configured to:

detect candidate regions corresponding to the object in the input image based on the first feature map and the third feature map; and determine a final detection region based on the candidate regions.

18. The object detection apparatus of claim 11, wherein the processor is further configured to:

divide a plurality of channels included in the second feature map;

produce an aggregated second feature map by performing an element-wide operation based on the divided channels; and extract the third feature map from the aggregated second feature map based on the region of the detected object.

* * * * *